United States Patent [19]
Kirk

[11] 3,917,367
[45] Nov. 4, 1975

[54] MINIMUM FRICTION BEARING

[76] Inventor: Clair Francis Kirk, 856 Pine St., Wheatland, Wyo. 82201

[22] Filed: Jan. 26, 1973

[21] Appl. No.: 327,785

[52] U.S. Cl. .................. 308/206; 308/200; 308/215
[51] Int. Cl.² .......................................... F16C 33/00
[58] Field of Search ................... 308/200, 206, 215

[56] References Cited
UNITED STATES PATENTS

| | | | |
|---|---|---|---|
| 258,413 | 5/1882 | Griffith | 308/215 |
| 621,376 | 3/1899 | Seubert | 308/200 |
| 639,205 | 12/1899 | Durnerin | 308/200 |
| 665,653 | 1/1901 | Faller | 308/200 |
| 951,177 | 3/1910 | Collins | 308/200 |
| 1,443,115 | 1/1923 | Breese | 308/200 |
| 1,773,461 | 8/1930 | Killian | 308/206 |

FOREIGN PATENTS OR APPLICATIONS

| | | | |
|---|---|---|---|
| 21,882 | 3/1910 | United Kingdom | 308/200 |
| 318,437 | 9/1929 | United Kingdom | 308/200 |

Primary Examiner—M. Henson Wood, Jr.
Assistant Examiner—Richard A. Bertsch

[57] ABSTRACT

The present invention instructs the construction of minimum friction ball, roller, and tapered roller bearings with support line point contact confinement of thrust. Radial confinement of double layer rotating members is by geometric configuration.

10 Claims, 10 Drawing Figures

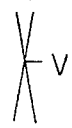
FIGURE 7
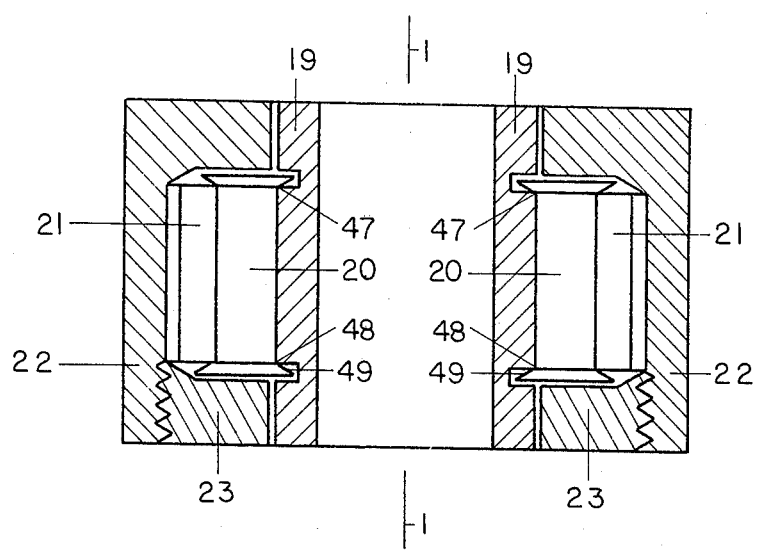
FIGURE 8
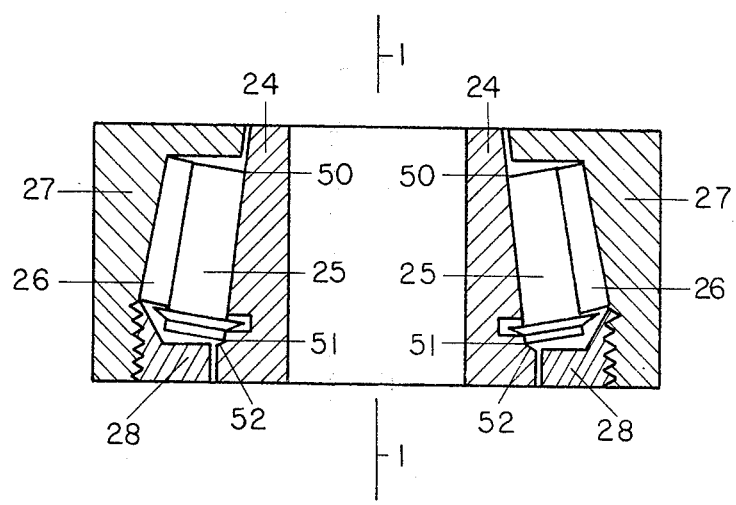

MINIMUM FRICTION BEARING

SUMMARY OF THE INVENTION

The object of the present invention is to teach bearing construction for the production of bearings that serve their function because of friction but with minimum generation of heat, energy loss.

The objective is accomplished by eliminating all sliding surfaces.

DESCRIPTION OF THE DRAWINGS

FIG. 7 illustrates a roller bearing for radial loads.
FIG. 8 illustrates a tapered roller bearing.

DESCRIPTION OF THE PREFERRED EMBODIMENTS

Figure 1:
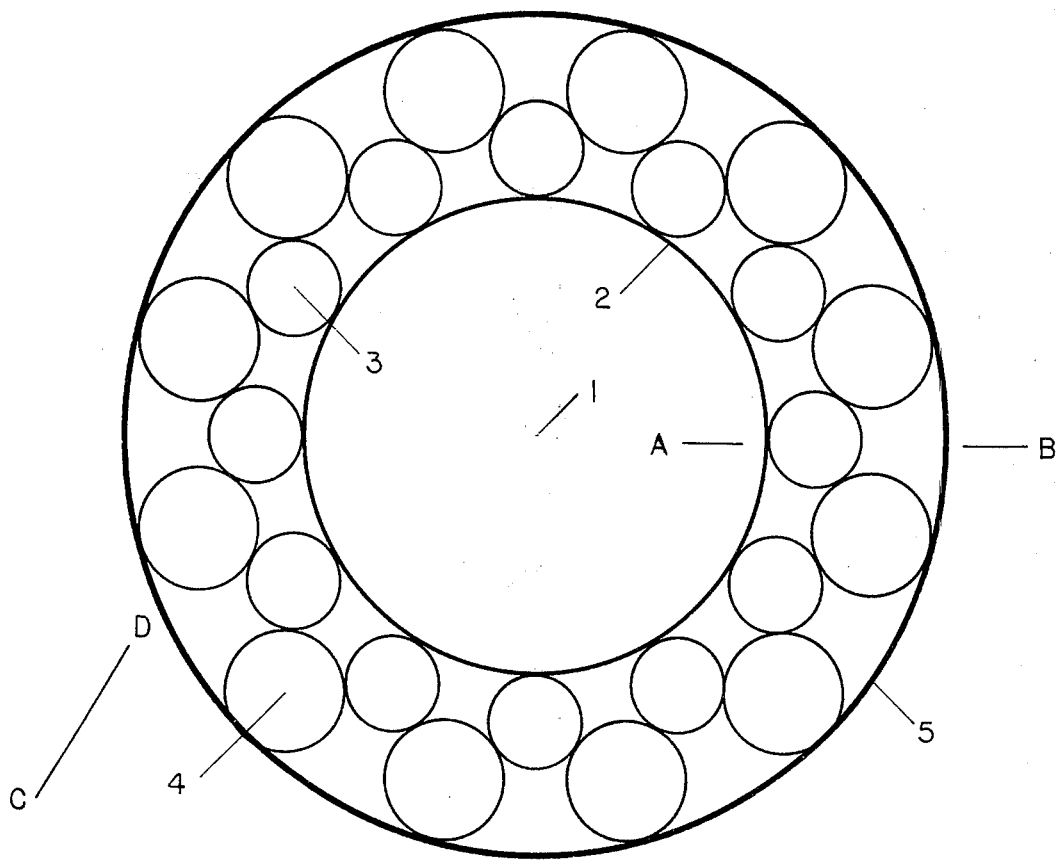
FIG. 1 is a side section of the invention.

On the drawings, FIG. 1 is a geometric configuration disclosed by N. A. Griffth in U.S. Pat. No. 258,413, patented May 23, 1882. The outstanding feature of this configuration is that all members are radially confined but still free to roll, no slippage. An additional advantage is that each rolling member shares an equal amount of the support load.

On FIG. 1, 1 is the rotating axis. Line 2 represents the inner race or the supported shaft. 3 are balls or rollers carring the shaft. 4 are spacing rollers or balls. Line 5 represents the outer race to offer fixed support with respect to the bearinged shaft 2.

It is observed that turning 2 clockwise turns the 3's counterclockwise which turns the 4's clockwise which roll around 5.

The FIG. 1 configuration eliminates sliding surfaces perpendicular to the rotating axis. The present invention provides confinement of members in the directions parallel to the rotating axis, thrust; thereby eliminating all sliding surfaces and the need for lubrication.

Figure 2:
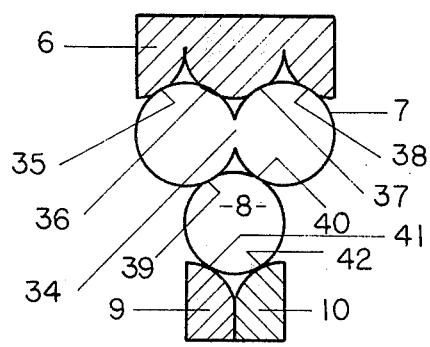
FIG. 2 is a section of FIG. 1 along line C–D.

FIG. 2 represents the base discovery of the present invention. 6 is a race and 9 plus 10 make up the other race. 6 can be the inner or outer race as long as 9 plus 10 makes up the other race. On the drawings, 6 is the inner race.

FIG. 2 illustrates that the ridges between the convex grooves prevent the joined sphere straddle rollers 7 from moving either direction when seated on the solid race 6. Sphere roller 8 is locked and seated between the joined spheres of the straddle rollers 7. The convex surfaces of sectional race 9 plus 10 seat rollers 8 and lock the unit together when convex ring 9 is secured to convex ring 10.

FIG. 2 then becomes a section of FIG. 1 on plane CD for illustration purposes. The 8 to 7 contact is correct but 6, 9, 10 picture is only for illustration.

Figure 3:
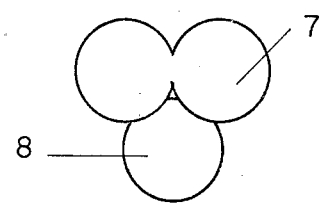
FIG. 3 illustrates four point contact.

FIG. 3, illustrates the four point contact that member 8 makes with two member 7's. FIG. 3 is a member 7 and 8 picture from plane AB of FIG. 1. Members 6 and 9 plus 10 of FIG. 2 are the correct shape with respect to plane AB FIG. 1.

The present invention is constructed by placing solid race 6 in position 2 of the FIG. 1 configuration, the joined straddle sphere rollers 7 in position 3, the sphere straddle rollers 8 in positions 4, and sectional race rings 9 plus 10 in position 5. The bearing constructed has support line point contact confinement of thrust between members and a free roll path for each member and provides support to a load from all directions.

The spheres of member 7 are joined together at point 34, FIG. 2, only to prevent them from slipping out of the FIG. 2 configuration. The junction 3/4 does not support any of the bearing load.

For no energy loss rotation, members 7 must be exactly the same size and shape with respect to each other. Each member 7 must make four or two point contact with member 6. For two point contact, at points 36 and 37 of FIG. 2, member 7 would appear as a sphere cut in half and rejoined with the flat surfaces parallel. However, with two point contact the junction 34 of FIG. 2 carries the load. Members 8 need not be the same diameter as members 7. They must be perfect spheres and exactly the same size with respect to each other. Each member 8 must make 4 point contact with two members 7 and 2 point contact with member 9 plus 10. Members 9 and 10 must be secured to each other.

Tie-point 34 establishes the FIG. 2 configuration. Contact points 35-36-37-38 are a support line between solid race 6 and joined sphere straddle rollers 7. Contact points 35 and 37 confine thrust in directions to the left on FIG. 2 and contact points 36 and 38 confine thrust in directions to the right on FIG. 2. This bi-function of contact points is hereafter word grouped into support line point contact confinement of thrust to define the element common between each two members for each of the device species.

Figure 4:
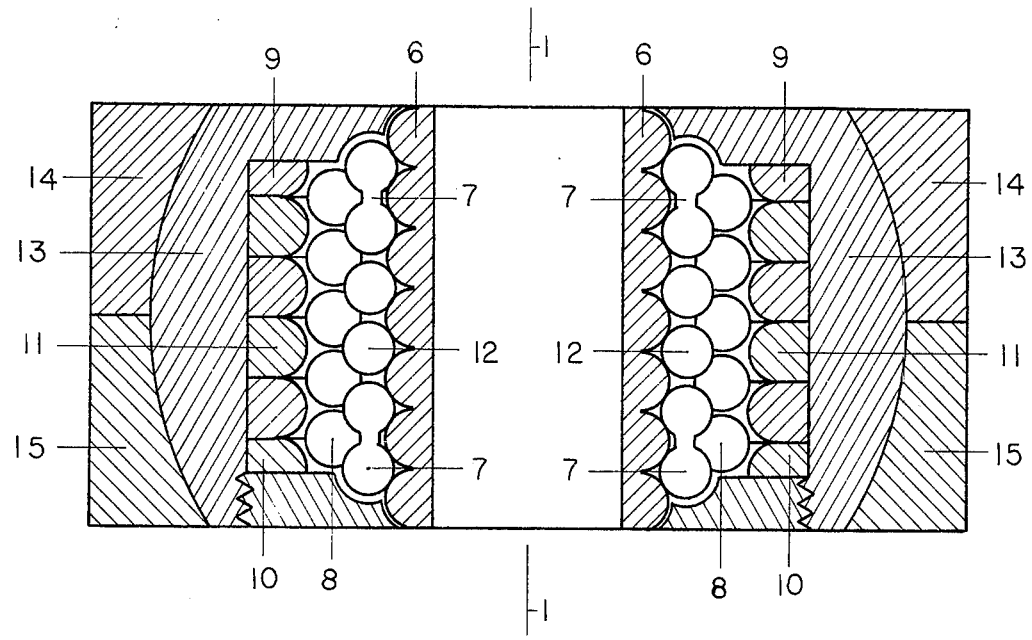
FIG. 4 is a section of FIG. 1 along line A–B.

Small solid rotors have been spun above 10 million rpm. and 3/16 of an inch in diameter rotors have turned 6.6 million rpm. while cushioned on hydrogen gas. FIG. 4 represents an effort to reach higher bearing rotation speed capability.

FIG. 4 is a sectional cut-away on plane AB of the FIG. 1 configuration. The improvement over the base discovery is illustrated by sphere roller 12. The joined sphere straddle rollers 7 need only be placed at the ends of the bearing. Once the FIG. 2 configuration is established at each end any number of sphere rollers 12 rows can be added as long as they remain roll circumference equal to joined sphere straddle rollers 7. Member 8 remains the same as the base discovery. Member 11 is a convex ring or a solid unit of 9 plus another 10.

Member 13 is the bearing container. It serves two purposes. It confines all members of the bearing and provides an additional safety feature. The safety feature being that the bearing can stop turning but it can not disassemble itself. One end of the container screws into the container cylinder for assembling and adjustment.

Members 14 and 15 provide self aligning to the support shaft when placed against the convex side wall of the bearing container 13. This self aligning feature is for extremely high speeds where the shaft is supported by two FIG. 4 bearings. Slack may exist between members which will cause vibration. The high friction surface between members 14, 15, and 13 generates heat to expand sectional race rings 9, 10, and 11 into the sphere rollers 8 to stop the vibration and control the temperature so that the rotation speed can then be increased.

The improved species FIG. 4 represents a ball bearing that can be engineered for any and all classes of load. The races and rollers should be as hard as possible for minimum energy loss. The FIG. 1 configuration should be spaced as close as possible without the sphere rollers touching. With a FIG. 2 configuration at each end, the FIG. 4 configuration can be extended indefinitely.

The suggested method, of assembling the FIG. 4 bearing, is to place ring 9 at the bottom of bearing container 13, and place on a flat surface. Using magnetic or other adhesive, space members 7 around the race 6 and slide into the container. Place sphere rollers 8 between each of the straddle rollers 7. Place a ring 11. Place another row of 8's. Place another ring 11. Then place a row of sphere rollers 12. Then another row of 8's and so on until the other 7's, their 8's, ring 10, and then the lid is screwed down to the proper tension and secured.

For most applications, members 13, 14, and 15 would represent one piece.

Although the FIG. 4 bearing will satisfy most bearing needs, the economics of construction are reduced by modification of the base discovery. Line 35-37-37-38 of FIG. 2 illustrates that points 35 and 38 are the only points needed for slippage free support line point contact confinement of thrust and suggest that the surfaces of race 6 and roller 7 by cylindrical.

Figure 5:
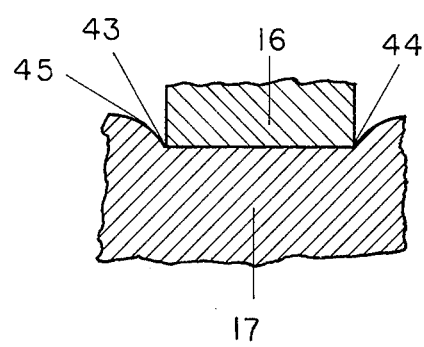
FIG. 5 illustrates line contact.

FIG. 5 illustrates that a line of contact points line 43-44 of FIG. 5, can meet a convex curved surface 45 at just one point 43. This point 43 confines 16 if it is a roller and 17 is the race, or 17 can be the roller and 16 the race, or both 16 and 17 will function as rollers. In each case minimum slippage occurs because the support line point contact confinement of thrust, of FIG. 2, is still present.

Figure 6:
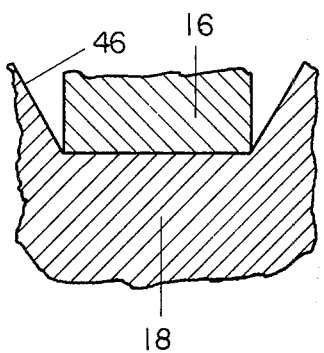
FIG. 6 illustrates a beveled surface.

FIG. 6 illustrates that a beveled surface 46 works just as well as convex surface 45. Again, 16 will function as a race or roller, 18 can be race or roller, or both 16 and 18 will function as rollers.

FIG. 7 represents a roller bearing for strictly radial load. Solid race 19 has two grooves which locks straddle rollers 20 between it's bevels when seated on solid race 19. The bevels of straddle rollers 20 lock cylindrical rollers 21 between the bevels. Rollers 21 are also locked and seated between the bevels of sectional race 22 on the bearing container.

FIG. 7 is a cross section of the FIG. 1 configuration at plane AB. Member 23 is the removable end of the bearing container for assembly and adjustment.

Support line point contact confinement of thrust is illustrated on FIG. 7 by line 47-48 against beveled surface 49 at points 47 and 48.

FIG. 8 represents a tapered roller bearing for thrust loads. The thrust is confined by the cone of the outer sectional race 27. Members 27, 26, 25, and 24 have conic surfaces which meet at a common vertex on the rotation axis v.

FIG. 8 is also a cross section of the FIG. 1 configuration on plane AB. Confinement of seated members in cone 27 is provided by a groove in the inner solid race 24 making support line point contact at the vertex of the angle formed with the bevel of a beveled flange at the largest on straddle roller 25. The contact point is on line to meet at the common vertex. The roller flange on straddle roller 25 also locks the seated tapered roller 26 against the outer sectional race 27. Roller 26 is locked into the seated position by the beveled edge of the bearing container 27 on which the sectional race has been cut. The removable end of bearing container 28, again, is for assembly and adjustment. Support line point contact confinement of thrust is illustrated on FIG. 8 by line 50-51 against beveled surface 52 at point 51.

Both bearings, of FIGS. 7 and 8, are assembled by positioning the rollers around the inside race and then sliding the unit into the bearing container. The removable ends 23 and 28 are then adjusted to remove slack and secured. It is best if end 23 and 28 are permanently secured as part of the bearing containers 22 and 27.

Figure 9:
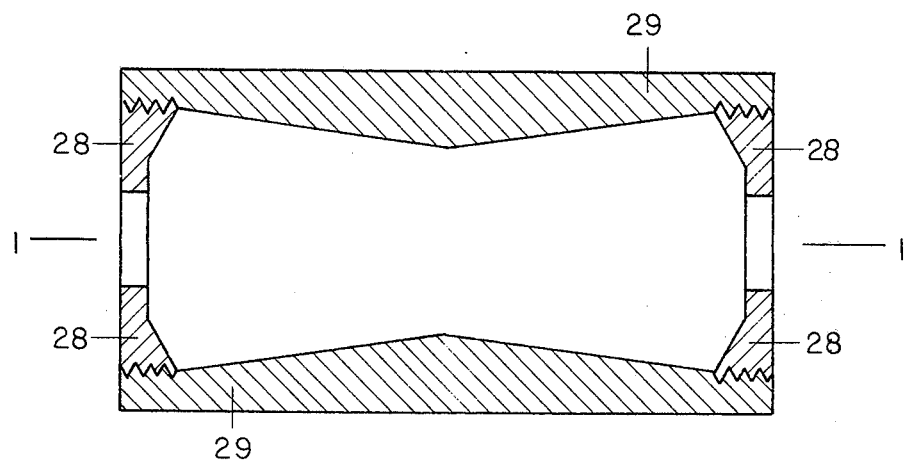
FIGS. 9 and 10 are further modifications of FIG. 8.

FIG. 9 illustrates that two bearing containers 27 can be joined to produce bearing container 29. Then two FIG. 8 bearings are placed with the smallest circumference ends of the tapered construction members adjacent to produce effectively the same bearing as the FIG. 4 ball bearing.

The produced bearing offers load support from all directions, is more economically constructed, has better size to useable weight ratio and will satisfy most bearing needs.

Figure 10:
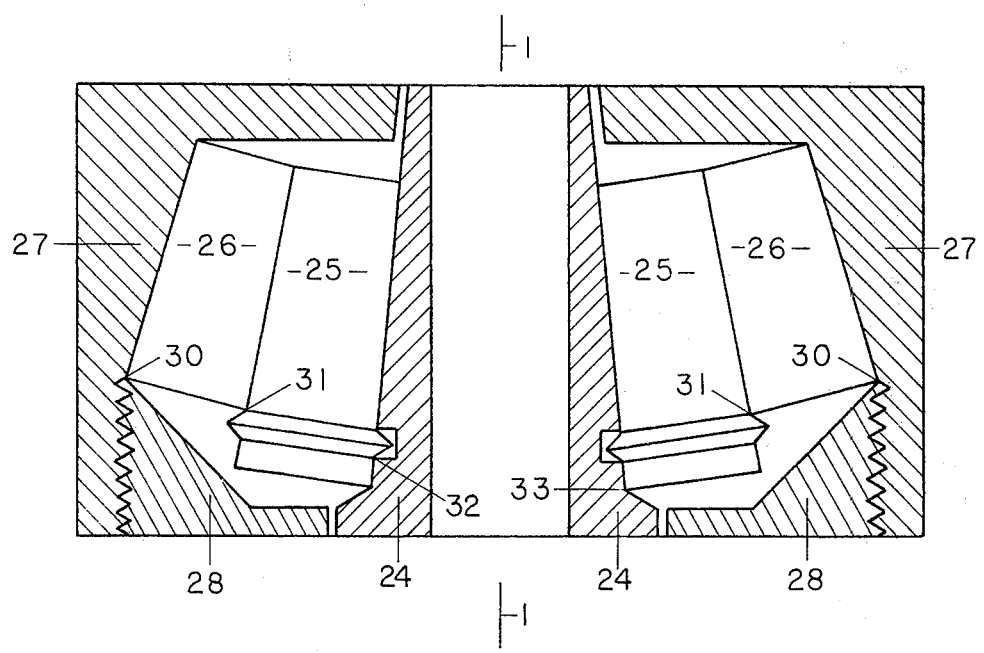

FIG. 10 is an illustration of contact confinement points of the tapered roller bearing illustrated by FIG. 8. The FIG. 1 configuration has been distorted for illustration purposes.

FIG. 10 illustrates two point contact option that solid race 24 can make with tapered straddle roller 25's beveled flange plus the end of the roller. It illustrates that the angle formed by the bevel of the flange with the rotation axis is optional within 90 degrees. The two point contact is at points 32 and 33. This locks members 24 and 25 together with respect to directions parallel to the rotation axis 1. The locking is continued to tapered roller 26 by points 31. The unit is locked to the large race by points 30.

The detailed explanation of the present invention begins with the wheel, or roller, itself. It has to be the greatest mechanical invention because it eliminates friction as a heat generator when it works with it's partner, a smooth surface. There is nothing about the outside surface of a wheel that slides to produce friction; which produces heat; which is energy loss.

The previous problem has been tying to hang something on the wheel without causing a rebellion known as friction. The wheel is an independent system and works best when left independent. The smooth surface represents a place for the wheel to do it's work.

The present invention represents a means that does not restrict the wheel.

The pure science of the subject is found in the "Theories of Relativity" contributed by Dr. Albert Einstein. Using these theories the absence of friction must be assumed if the planets are to remain in orbit. Simply put, the present invention provides unrestricted orbits for the wheels by support line point contact confinement of thrust and friction free movement occurs.

An incomplete orbit was established by Griffth, represented in FIG. 1. However, the members are not confined in his device, or later devices, without restriction and therefore do not represent true orbits. The freedom from restriction is represented on FIG. 2. This configuration provides support line point contact confinement and of thrust leaves an unrestricted orbit, race, for each wheel, roller, and demonstrates that unrestricted wheels will work together without heat generating friction.

With an understanding of how wheels should work, it is observed that most of the wheel, of the wheels, of the FIG. 2 configuration serves no useful purpose. The point contact confinement for orbit is needed only at the ends of the wheel. For this reason the used part of the FIG. 2 configuration is extended into a cylindrical roller with matching race and the support line point contact of thrust for orbit is retained at the ends which is represented by FIG. 7.

The mathemetics of the geometric cone enable it to produce the same effect as the point contact confinement one direction of thrust in the support line contact confinement of thrust configuration with the advantage of more support capability. When cone confinement replaces point contact confinement at one end, the FIG. 8 bearing developes.

When two FIG. 8 bearings are placed with the small ends of the cones facing each other and joined at the outside circumference, a near perfect bearing is produced.

American physicist Jesse W. Beam has magnetically suspended a rotor in a sealed glass container of high vacuum and rotated it to extremely high speed. With power off, the rotor continued to coast with less than 1 revolution per second loss in speed during a 24 hour period of time.

A well constructed example of the present invention is expected to produce simular mechanical results.

I claim as my invention:

1. A radial roller bearing comprising a solid race cut with convex grooves, with the said convex grooves support line point contact confining thrust of convex grooved straddle rollers by the convex surfaces of the said straddle roller grooves seated on each side of the ridge between two adjacent convex grooves in the said solid race with the said straddle rollers support line point contact confining thrust of spherical rollers by the said spherical rollers being seated in the convex grooves of the said straddle rollers with the said spherical rollers also receiving support line point contact confinement of thrust by a sectional race, said sectional race comprising convex rings secured together with the said spherical rollers seated in the convex grooves formed between the said secured convex rings.

2. A roller bearing according to claim 1 wherein the grooves in the solid race are beveled and the sectional race is comprised of beveled rings.

3. A roller bearing according to claim 1 wherein the grooves in the straddle rollers are beveled and the sectional race is comprised of beveled rings.

4. A roller bearing according to claim 1 wherein the solid race is extended, a row of straddle rollers seated in the end grooves at each end of said extended solid race, rows of roll circumference equal spherical rollers seated in the said extended solid race grooves between the two said rows of straddle rollers, a row of additional spherical rollers seated in the said straddle roller grooves of each said row of straddle rollers, a row of said additional spherical rollers seated in the grooves between each said row of straddle rollers and the adjacent row of first said spherical rollers, a row of said additional spherical rollers seated in the grooves between each two adjacent rows of first said spherical rollers, with each row of said additional spherical rollers seated in the groove between two adjacent rings with all said rings secured together to form a sectional race.

5. A radial roller bearing comprising a solid race cut with two grooves with the said grooves support line point contact confining thrust of outwardly beveled flangs at the ends of cylindrical straddle rollers seated on the said solid race, said flangs of said straddle rollers support line point contact confining thrust of cylindrical rollers seated on said straddle rollers, said cylindrical rollers seated on a sectional race and also receiving support line point contact confinement of thrust from beveled flangs at the ends of a cylindrical said sectional race, said sectional race being constructed of at least two secured pieces with the junction on the said cylinder between the said beveled flangs of the said sectional race.

6. A roller bearing according to claim 5 wherein the outward outward flangs on the straddle rollers are convex and the flangs on the sectional race are convex.

7. A radial roller bearing comprising a tapered solid race cut with a groove at the largest circumference end of the said taper with the said groove support line point contact confining thrust of an outwardly beveled flang at the largest circumference end of tapered straddle rollers seated on the said tapered solid race with the said flang of the said tapered straddle rollers support line point contact confining thrust of tapered rollers seated on the said tapered straddle rollers, said tapered rollers seated on a sectional race and also receiving support line point contact confinement of thrust from a beveled flang at the largest circumference end of a tapered sectional race, said sectional race comprising two secured pieces with the junction at the vertex of the angle formed by the taper on the said tapered sectional race and the bevel on the said flang of the said tapered section race, extended support lines of all said support line contact confinements of thrust meeting at a common vertex on the rotation axis of the inner race.

8. A tapered roller bearing according to claim 7 wherein the flang on the straddle rollers is convex and the flang on the sectional race is convex.

9. A tapered roller bearing according to claim 7 wherein the largest circumference end of the tapered straddle rollers receives support line point contact confinement of thrust from an outwardly beveled flang on the solid race.

10. Two tapered roller bearings according to claim 7 wherein the smallest circumference ends of the tapered construction members of each said tapered roller bearing are placed adjacent in a one piece outer race.

* * * * *